United States Patent
Underwood et al.

(10) Patent No.: US 9,553,491 B2
(45) Date of Patent: Jan. 24, 2017

(54) ALTERNATOR MOUNTING ASSEMBLY

(71) Applicant: Caterpillar Inc., Peoria, IL (US)

(72) Inventors: Jay S. Underwood, West Lafayette, IN (US); Eric L. Abernathy, Cuba, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/058,158

(22) Filed: Mar. 2, 2016

(65) Prior Publication Data
US 2016/0181887 A1    Jun. 23, 2016

(51) Int. Cl.
*F16M 1/00*     (2006.01)
*H02K 5/24*     (2006.01)
*F02B 63/04*    (2006.01)
*H02K 7/18*     (2006.01)

(52) U.S. Cl.
CPC ............. *H02K 5/24* (2013.01); *F02B 63/04* (2013.01); *H02K 7/1815* (2013.01)

(58) Field of Classification Search
USPC ........................................................ 248/675
See application file for complete search history.

(56) References Cited

U.S. PATENT DOCUMENTS

| | | | |
|---|---|---|---|
| 4,494,723 A * | 1/1985 | Kobuki | B60K 5/1208 180/312 |
| 4,666,122 A | 5/1987 | Goodard | |
| 4,849,665 A | 7/1989 | Kitamura et al. | |
| 4,945,272 A | 7/1990 | Ochi et al. | |
| 4,980,589 A | 12/1990 | Ochi et al. | |
| 5,295,653 A * | 3/1994 | Miyazaki | B21D 53/00 248/121 |
| 5,435,516 A * | 7/1995 | Ogasawara | F16F 1/3849 248/635 |
| 5,718,407 A * | 2/1998 | Lee | F16F 1/3842 180/312 |
| 5,938,169 A * | 8/1999 | Ogawa | F02B 67/06 123/195 A |
| 6,304,016 B1 * | 10/2001 | Frederick | H02K 5/24 123/195 A |
| 6,349,919 B1 * | 2/2002 | Zupan | F02B 67/00 248/274.1 |
| 6,378,469 B1 * | 4/2002 | Hiranuma | F02B 63/04 123/195 C |
| 7,424,886 B1 * | 9/2008 | Herzer | F02B 43/10 123/195 A |
| 7,455,278 B2 * | 11/2008 | Hsu | A47J 37/041 248/300 |
| 8,511,272 B2 | 8/2013 | Koyama et al. | |
| 9,091,322 B2 * | 7/2015 | Wang | F16F 15/04 |
| 2004/0169118 A1 * | 9/2004 | Talaucher | B29C 33/005 248/314 |

(Continued)

FOREIGN PATENT DOCUMENTS

EP          1087126          3/2001

*Primary Examiner* — Monica Millner

(57) ABSTRACT

A mounting assembly for mounting an alternator is disclosed. The mounting assembly includes a first bracket, and a second bracket. The first bracket includes a first member, a second member, a third member, a fourth member, and a fifth member. The second bracket includes a first section, a second section, a third section, and a fourth section. The alternator is mounted using the first bracket and the second bracket for reducing vibrations during operation.

1 Claim, 4 Drawing Sheets

(56) References Cited

U.S. PATENT DOCUMENTS

| | | | |
|---|---|---|---|
| 2006/0091751 A1 | 5/2006 | Gaul | |
| 2006/0255666 A1* | 11/2006 | Williams | H02K 5/24 310/51 |
| 2008/0073479 A1* | 3/2008 | Ohji | B60K 5/12 248/638 |
| 2008/0134997 A1* | 6/2008 | Ito | F01P 5/06 123/41.65 |

* cited by examiner

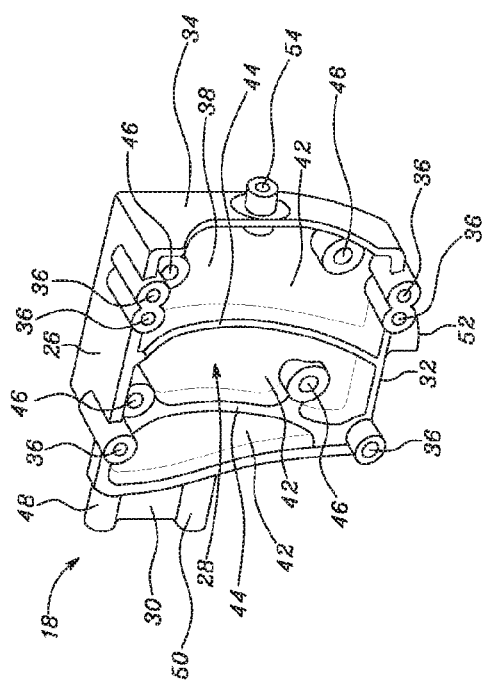
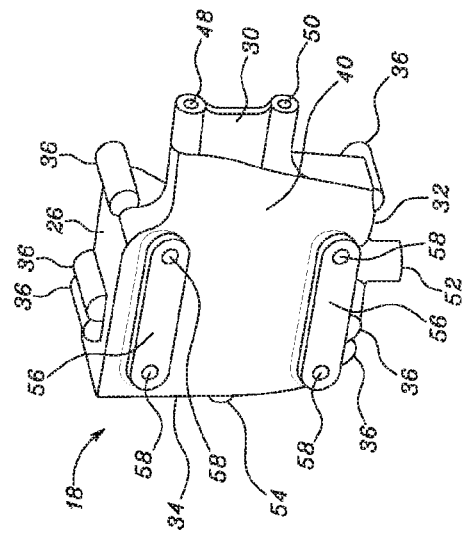

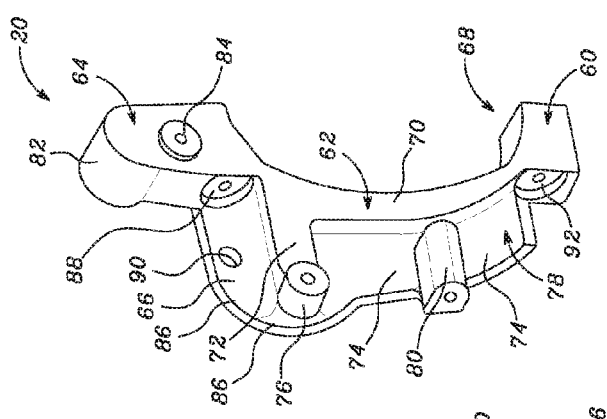
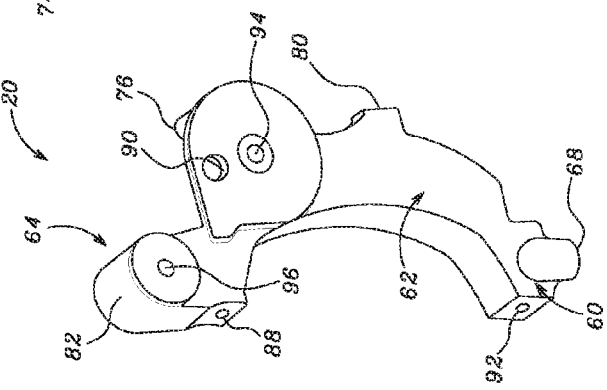

ALTERNATOR MOUNTING ASSEMBLY

TECHNICAL FIELD

The present disclosure relates to mounting assemblies for mounting alternators, and more specifically, to an improved mounting assembly for mounting an alternator that reduces vibrations.

BACKGROUND

Internal combustion engines generally have an alternator coupled near an engine. The alternator provides electric current for a variety of components within a machine. The alternator emits a time-varying magnetic field that produces the electric current. Generally, a mounting bracket (also called mounting assembly) is used for mounting the alternator at a specific position within the internal combustion engine.

Currently, large internal combustion engines, such as engines for powering construction and mining machinery, produce vibrations during the operation of the internal combustion engine. As the mounting bracket is directly mounted on to the internal combustion engine, the mounting bracket and the alternator also vibrate with the internal combustion engine. Continuous vibrations from the internal combustion engine generate high level of stress concentrations around the mounting bracket, which results into cracking and bending of the mounting bracket. Additionally, it also generates undesirable noise during operation of the internal combustion engine. A failure of the mounting bracket and/or the alternator leads to engine downtime and costly repairs. Further, the mounting brackets, in use currently, are bulky and have huge weight, so the production cost of the mounting brackets is also high. Thus, there is a need of an improved and compact mounting assembly for mounting the alternator that reduces vibrations and other failures.

U.S. Pat. No. 4,980,589 (hereinafter referred as '589) discloses a vehicle alternator. The vehicle alternator comprises a pair of brackets for holding front and rear portions of a stator. A front bracket having projecting flanges at respective vertical ends while a rear bracket has a projecting flange at one vertical end. A pair of separate mounting pieces is provided for attaching the alternator to the engine via the bracket flanges. The mounting pieces have attachment bosses with holes, and one of the mounting pieces is provided with bosses at both horizontal ends for connecting the brackets to each other at the flanges. The '589 reference does not disclose any mechanism to reduce the external vibrations experienced by a mounting assembly, therefore the '589 fails to address the problem of external vibrations experienced by the alternator during operations. Thus, there is a need of an improved mounting assembly for mounting the alternator that reduces vibrations and other failures.

SUMMARY OF THE DISCLOSURE

In one aspect of the present disclosure, a mounting assembly for mounting an alternator is provided. The mounting assembly includes a first bracket, and a second bracket. The first bracket includes a first member, a second member, a third member, a fourth member, and a fifth member. The first member having a number of first holes. The first holes are used for coupling the alternator with the first bracket. The second member having a first surface and a second surface. The first surface is divided into a number of sections using a number of ribs. The number of sections having a number of second holes. The second holes are used for mounting the first bracket on a surface. The third member protrudes from the second member. The fourth member having the first holes and a first protruding member. The fifth member having a second protruding member. The second bracket includes a first section, a second section, a third section, and a fourth section. The first section having a third protruding member. The second section having a first portion, a second portion and a third portion. The second portion having a fourth protruding member. The third portion having a curved surface with a fifth protruding member. The third section having a sixth protruding member and a first protruding hole. The fourth section is integrated with the third section and the second section. The fourth section having a curved surface. The alternator is mounted using the first bracket and the second bracket for reducing vibrations during operation.

Other features and aspects of this disclosure will be apparent from the following description and the accompanying drawings.

BRIEF DESCRIPTION OF THE DRAWINGS

FIG. 2 is a perspective front view of a first bracket of the mounting assembly shown, in accordance with the present disclosure;

FIG. 3 is a perspective back view of the first bracket of the mounting assembly shown, in accordance with the present disclosure and back views;

FIG. 4 is a perspective front view of a second bracket of the mounting assembly shown, in accordance with the present disclosure;

FIG. 5 is a perspective back view of the second bracket of the mounting assembly shown, in accordance with the present disclosure.

DETAILED DESCRIPTION

Figure 1:
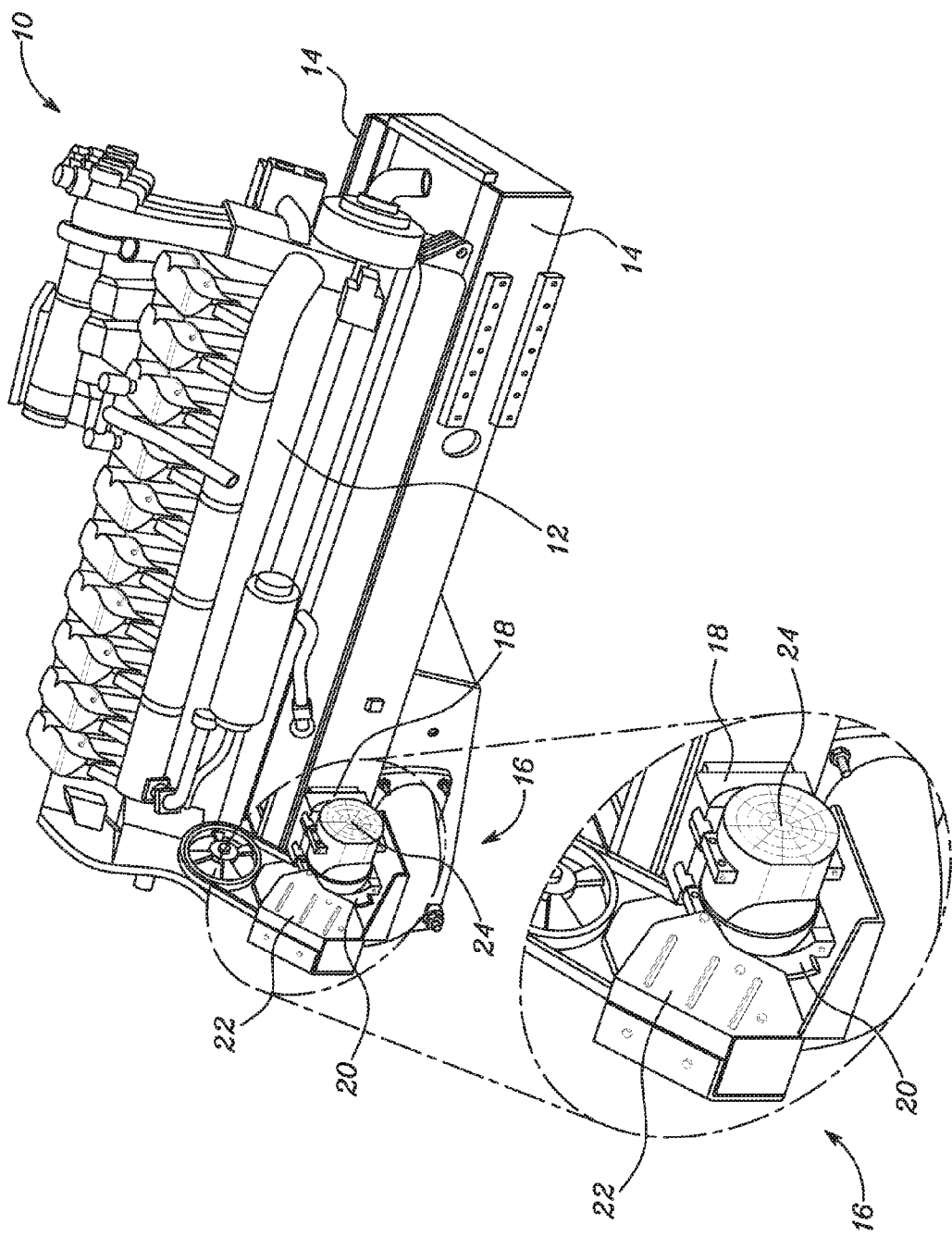
FIG. 1 is a perspective view of an internal combustion engine having a mounting assembly for an alternator shown, in accordance with the concepts of the present disclosure.
Figure 6:
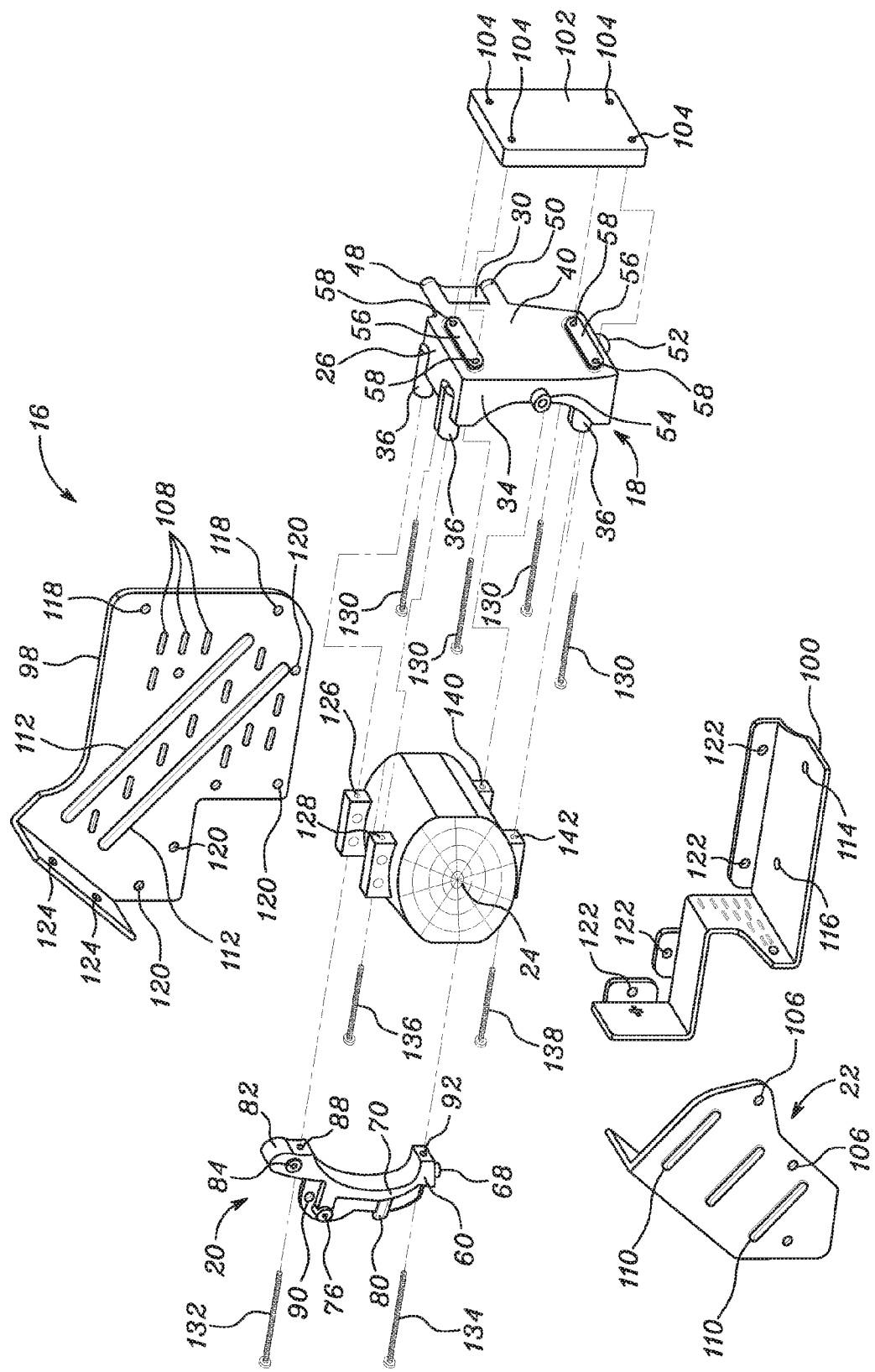
FIG. 6 is an exploded view of the mounting assembly, in accordance with the present disclosure.

Referring to FIG. 1, an internal combustion engine 10 includes an engine block 12 mounted on rails 14. The internal combustion engine 10 includes other components such as, holes, pipes, ducts, ribs, etc. For the purpose of simplicity, various other components of the internal combustion engine 10 are not labeled in FIG. 1. The rails 14 are used for mounting a mounting assembly 16. The mounting assembly 16 includes a first bracket 18, a second bracket 20, and a guard member 22. The mounting assembly 16 supports an alternator 24 via the first bracket 18 and the second bracket 20. The guard member 22 is designed in such a way that the guard member 22 is easily placed over the alternator 24. The guard member 22 includes impressions (as an impression 110 as shown in FIG. 6). The location of the mounting assembly 16 is on a surface of one of the rails 14 having a low level of vibration, i.e. away from the engine block 12.

Referring to FIGS. 2 and 3, the first bracket 18 is used for mounting the alternator 24. The first bracket 18 includes a first member 26, a second member 28, a third member 30, a fourth member 32, and a fifth member 34. The first member 26 having a number of first holes 36. The alternator 24 is mounted with the first bracket 18 with the help of fasteners (not shown) using the first holes 36. The second member 28 having a first surface 38 and a second surface 40. The first surface 38 is divided into a number of sections 42 using a number of ribs 44. The sections 42 having a number of second holes 46. The second holes 46 are used for mounting the first bracket 18. The second holes 46 accommodate fasteners (not shown) for mounting the first bracket 18 on the surface of the rails 14.

Referring to FIGS. 2 and 3, the third member 30 protrudes from the second member 28. The third member 30 includes a first cylindrical portion 48, and a second cylindrical portion 50. In an embodiment, the first cylindrical portion 48, and the second cylindrical portion 50 are hollow members for receiving the fasteners (not shown). The fourth member 32 having the number of first holes 36 and a first protruding member 52. The fifth member 34 having a second protruding member 54. In an embodiment, the first protruding member 52 and the second protruding member 54 are hollow members for receiving the fasteners (not shown). The second surface 40 having mounting pads 56 with a number of third holes 58. It will be apparent to one skilled in art that the first bracket 18 may have other shape and include any number of members of a variety of shapes and design without departing from the meaning and scope of the disclosure.

Referring to FIGS. 3 and 4, the second bracket 20 is used for mounting the alternator 24. The second bracket 20 includes a first section 60, a second section 62, a third section 64, and a fourth section 66. The first section 60 having a third protruding member 68. The second section 62 having a first portion 70, a second portion 72 and a third portion 74. The second portion 72 having a fourth protruding member 76. The third portion 74 having a curved surface 78 with a fifth protruding member 80. In an embodiment, the third protruding member 68, the fourth protruding member 76, and the fifth protruding member 80 are hollow members for receiving the fasteners (not shown).

Referring to FIGS. 3 and 4, the third section 64 having a sixth protruding member 82 and a first protruding hole 84. The fourth section 66 is integrated with the third section 64 and the second section 62. The fourth section 66 having a curved surface 86, a fourth hole 88, and a fifth hole 90. The first section 60 further having a sixth hole 92. The second bracket 20 having a seventh hole 94 and an eight hole 96.

Referring to FIG. 6, an exploded view of components, such as the first bracket 18, the second bracket 20, the guard member 22, a plate 98, a base 100, a bracket 102, etc. is illustrated. The components are interconnected as described herein. The base 100 is connected to the plate 98 using fastening means via holes 120 and holes 122. The first protruding member 52 is used for receiving the fastener (not shown) to couple the first bracket 18 with the base 100 via a hole 114. The base 100 is coupled with the alternator 24 using fastening means via a hole 116. In other words, the alternator 24 is placed over the base 100 and the alternator 24 is also coupled with the first bracket 18 as described below. The plate 98 having impressions 112 and is coupled with the first bracket 18 using the first cylindrical portion 48 and the second cylindrical portion 50 via holes 118 (as described below). The bracket 102 is used for mounting the first bracket 18 on a vertical surface of one of the rails 14 through four holes 104. As an example, the holes 104 overlap with the second holes 46 of the first bracket 18 and the third holes 58 of the mounting pads 56 and accommodate fasteners (not shown) for mounting the first bracket 18 on the surface of one of the rails 14 as described below. Then the alternator 24 is mounted on the first bracket 18 using a plurality of fasteners (not shown) accommodated in the first holes 36. The guard member 22 is coupled with the plate 98 using fastening means via holes 124 on the plate 98 and holes (not shown) on the guard member 22. The guard member 22 is connected to the second bracket 20 using fasteners accommodated through holes 106.

Referring to FIG. 6, the first cylindrical portion 48, and the second cylindrical portion 50 of the first bracket 18 are used for receiving the fasteners (not shown) to couple the first bracket 18 with the plate 98. The third protruding member 68 is used for receiving the fasteners (not shown) to couple the second bracket 20 with the base 100. The fourth protruding member 76 and the first protruding hole 84 are adapted to receive the fasteners (not shown) to couple the second bracket 20 with the guard member 22. The fifth hole 90 is adapted to receive the fasteners (not shown) to couple second bracket 20 with plate 98.

Referring to FIG. 6, the alternator 24 is coupled with the first bracket 18 and the second bracket 20 using screws 132, 134, 136, 138 as described herein. For example, the screw 132 is passed through the fourth hole 88, a hole 126 and is further received in the first hole 36 of the first bracket 18. Further, the screw 134 is passed through the sixth hole 92, a hole 140, and is further received in the first hole 36 of the first bracket 18. Furthermore, the screw 136 is passed through a hole 128 and is further received by the first hole 36 of the first bracket 18. Furthermore, the screw 138 is passed through a hole 142 and is further received by the first hole 36 of the first bracket 18.

Referring to FIG. 6, the first bracket 18 is coupled with the bracket 102 using four screws 130. For example, the four screws 130 are coupled with the surface of the rail 14 (shown in FIG. 1) via the second holes 46 (as shown in FIG. 2), the third holes 58 and the holes 104 to couple the first bracket 18 and the bracket 102 on the surface of the rail 14.

It will be apparent to one skilled in art that the shape or design or weight of the first bracket 18 and the second bracket 20 may vary in order to reduce vibrations for the alternator 24 without departing from the meaning and scope of the disclosure. The first bracket 18, the second bracket 20, and the guard member 22 are constructed from materials, but are not limited to, steel, stainless steel, iron, copper, or other alloys etc without departing from the meaning and scope of the disclosure.

INDUSTRIAL APPLICABILITY

Internal combustion engines employ alternators for providing electric current to various components of the engine. Typically, the alternator is mounted near to the internal combustion engine using a specifically designed mounting bracket. As the mounting bracket is directly mounted on to the internal combustion engine, the mounting bracket and the alternator also vibrate during operations. However, conventional mounting brackets are not able to withstand the continuous vibrations that results into cracking and bending of the mounting bracket and also malfunctioning of the alternator.

Referring to FIG. 1, the present disclosure provides the mounting assembly 16 that includes the first bracket 18, and the second bracket 20 for mounting the alternator 24 to the surface of the rails 14 having a low level of vibration, i.e. away from the engine block 12. Therefore, the mounting assembly 16 and the alternator 24 experience low vibrations and thereby, increasing the efficiency and the life of the alternator 24. As a result, maintenance requirements and idle time of the internal combustion engine 10 is reduced. Also, due to lower vibrations, the alternator 24 works efficiently and generates minimal noise during operation.

Referring to FIGS. 1-3, the ribs 44 of the first bracket 18 provide structural rigidity to the first bracket 18 and prevent the buckling, thereby, making the design of the first bracket 18 robust. In an embodiment, the ribs 44 further provide dampening of vibrations from the internal combustion engine 10. Further, the first bracket 18 and the second bracket 20 have compact design and hence are easily manufactured with lesser materials and hence save production cost.

Referring to FIG. 6, the first bracket 18 and the second bracket 20 of the mounting assembly 16 reduce vibrations during operation and also offer prolonged life to the alternator 24. The plate 98 includes cavities 108 to dissipate the heat from the alternator 24 and also circulating air inside the alternator 24. During operations, the plate 98 and the guard member 22 protects the user or other objects from the alternator 24. The plate 98 and the guard member 22 include impressions 110 for providing strength to the plate 98 and the guard member 22. The design of the second bracket 20 facilitates mounting of the guard member 22 to the mounting assembly 16 such that complete assembly is compact.

While aspects of the present disclosure have been particularly shown and described with reference to the embodiments above, it will be understood by those skilled in the art that various additional embodiments are contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A mounting assembly for mounting an alternator, the mounting assembly comprising:
   a first bracket including:
      a first member having a plurality of first holes;
      a second member having a first surface and a second surface, the first surface is divided into a plurality of sections via a plurality of ribs, the plurality of sections having a plurality of second holes for mounting the first bracket;
      a third member protruding from the second member;
      a fourth member having the plurality of first holes and a first protruding member; and
      a fifth member having a second protruding member; and
   a second bracket including:
      a first section having a third protruding member;
      a second section having a first portion, a second portion having a fourth protruding member, a third portion having a curved surface with a fifth protruding member;
      a third section having a sixth protruding member and a first protruding hole; and
      a fourth section integrated with the third section and the second section, the fourth section having a curved surface;
      wherein the alternator is mounted using the first bracket and the second bracket for reducing vibrations during operation.

\* \* \* \* \*